United States Patent
Ebiko (10) Patent No.: US 8,151,841 B2
(45) Date of Patent: Apr. 10, 2012

(54) PNEUMATIC TIRE

(75) Inventor: Masahiro Ebiko, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 404 days.

(21) Appl. No.: 12/162,026

(22) PCT Filed: Sep. 5, 2007

(86) PCT No.: PCT/JP2007/067294
§ 371 (c)(1),
(2), (4) Date: Jul. 24, 2008

(87) PCT Pub. No.: WO2008/050545
PCT Pub. Date: May 2, 2008

(65) Prior Publication Data
US 2009/0205763 A1 Aug. 20, 2009

(30) Foreign Application Priority Data
Oct. 25, 2006 (JP) ................. 2006-290204

(51) Int. Cl.
*B60C 9/22* (2006.01)
*B60C 9/18* (2006.01)
*B60C 11/00* (2006.01)

(52) U.S. Cl. .............. 152/209.14; 152/454; 152/531; 152/536; 152/538

(58) Field of Classification Search .......... 152/209.1, 152/209.5, 209.14, 454, 526, 527, 531, 538
See application file for complete search history.

(56) References Cited

U.S. PATENT DOCUMENTS

| | | | |
|---|---|---|---|
| 4,293,019 A * | 10/1981 | Maiocchi | 152/527 |
| 5,228,933 A | 7/1993 | Kawabata et al. | |
| 5,277,238 A | 1/1994 | Kawabata et al. | |
| 5,593,521 A * | 1/1997 | Iseki | 152/209.5 |
| 6,615,887 B2 * | 9/2003 | Denoueix et al. | 152/209.5 |
| 2002/0011295 A1 | 1/2002 | Denoueix et al. | |
| 2006/0118220 A1 | 6/2006 | Nguyen et al. | |

FOREIGN PATENT DOCUMENTS

| | | | |
|---|---|---|---|
| CN | 1785698 A | | 6/2006 |
| JP | 01-101201 | * | 4/1989 |
| JP | 03-057703 | * | 3/1991 |
| JP | A 3-82604 | | 4/1991 |

(Continued)

OTHER PUBLICATIONS

English machine translation of Ebiko, JP2005-119481, no date.*

(Continued)

*Primary Examiner* — Justin R Fischer
*Assistant Examiner* — Robert Dye
(74) *Attorney, Agent, or Firm* — Greer, Burns & Crain, Ltd.

(57) ABSTRACT

A pneumatic tire includes a tread portion on each side of the equatorial plane. At least two circumferential main grooves and three land portions are formed in the tread portion. In a cross section in a meridian direction of the pneumatic tire, profile lines of the land portions form arcs, and an intersection of extension lines of profile lines of adjacent land portions forms an inflection point in a circumferential main groove. Tensile strength of a reinforcing layer in the land portions is larger than that in the circumferential main groove having the inflection points.

14 Claims, 5 Drawing Sheets

FOREIGN PATENT DOCUMENTS

| | | |
|---|---|---|
| JP | A 3-169723 | 7/1991 |
| JP | A 3-200404 | 9/1991 |
| JP | A 3-220001 | 9/1991 |
| JP | U 3-123702 | 12/1991 |
| JP | A 4-46802 | 2/1992 |
| JP | A 4-197804 | 7/1992 |
| JP | A 5-201204 | 8/1993 |
| JP | A 5-310008 | 11/1993 |
| JP | A 5-330310 | 12/1993 |
| JP | A 6-344720 | 12/1994 |
| JP | A 7-9816 | 1/1995 |
| JP | A 7-61209 | 3/1995 |
| JP | A 11-291713 | 10/1999 |
| JP | A 2002-192914 | 7/2002 |
| JP | A 2003-511299 | 3/2003 |
| JP | A 2005-119481 | 5/2005 |
| JP | A 2005-280511 | 10/2005 |

OTHER PUBLICATIONS

English machine translation of Shirai et al., JP05-201204, no date.*
Official Action issued by the Chinese Patent Office in corresponding Chinese Application No. 20078001087.7, dated Oct. 26, 2010.

* cited by examiner

| EXAMPLE | | CONVENTIONAL EXAMPLE 1 | CONVENTIONAL EXAMPLE 2 | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|---|---|---|
| UT GAGE/GROOVE DEPTH | | 0.6 | 0.6 | 0.6 | 0.6 | 0.6 | 0.6 | 0.6 | 0.6 | 0.1 | 0.6 |
| TENSILE STRENGTH INDEX | CENTER LAND PORTION | 100 | 100 | 100 | 100 | 100 | 100 | 100 | 100 | 100 | 100 |
| | CIRCUMFERENTIAL MAIN GROOVE 1 | 100 | 100 | 50 | 50 | 50 | 50 | 30 | 80 | 50 | 50 |
| | SECOND LAND PORTION | 100 | 100 | 100 | 50 | 50 | 100 | 100 | 100 | 100 | 120 |
| | CIRCUMFERENTIAL MAIN GROOVE 2 | 100 | 100 | 50 | 50 | 50 | 50 | 30 | 80 | 50 | 70 |
| | SHOULDER LAND PORTION | 100 | 100 | 100 | 100 | 100 | 100 | 100 | 100 | 100 | 140 |
| NUMBER (N) OF CIRCUMFERENTIAL MAIN GROOVES | | 4 | 4 | 4 | 4 | 4 | 4 | 4 | 4 | 4 | 4 |
| TR1 | | 1000 | 2000 | 2000 | 2000 | 2000 | 1500 | 2000 | 2000 | 2000 | 2000 |
| TR2 | | 800 | 1500 | 1500 | 1500 | 1500 | 1500 | 1500 | 1500 | 1500 | 1500 |
| TR3 | | 400 | 1000 | 1000 | 1000 | 1000 | 1500 | 1000 | 1000 | 1000 | 1000 |
| θ1 | | - | 1.5 | 1.5 | 1 | 2 | 1.5 | 1.5 | 1.5 | 1.5 | 1.5 |
| θ2 | | - | 2.5 | 2.5 | 3 | 2 | 2.5 | 2.5 | 2.5 | 2.5 | 2.5 |
| 30 km/h ICE HANDLING | | 100 | 105 | 110 | 105 | 105 | 105 | 105 | 105 | 105 | 110 |
| 50 km/h ICE HANDLING | | 100 | 98 | 110 | 105 | 105 | 105 | 105 | 105 | 105 | 115 |

PNEUMATIC TIRE

This application is a U.S. National Phase under 35 U.S.C. §371, of International Application No. PCT/JP2007/067294, filed Sep. 5, 2007.

TECHNICAL FIELD

The present invention relates to a pneumatic tire and more particularly to a pneumatic tire with improved ice handling performance.

BACKGROUND ART

With improvement in road maintenance (effects of snow removal and snow melting agent), the traveling speed range of a vehicle tends in general to increase recently. Thus, tires, such as winter tires for RV (Recreational Vehicle), are required to ensure during traveling in a certain traveling speed range (40 [km/h] or more) as well as traveling at a low speed.

To achieve such ice handling performance, a technology disclosed in Patent document 1 has been known as related to a conventional pneumatic tire. The conventional pneumatic tire includes symmetric profiles with respect to an equatorial plane. The profile on each side of the equatorial plane has at least three tread radii and a tread surface. At least two circumferential main grooves are formed on the tread surface. Part of the profile between the equatorial plane and the innermost circumferential main groove, part between adjacent circumferential main grooves, and part between the outermost circumferential main groove and a tread contact edge of a shoulder portion form arcs, respectively. On the profile are formed inflection points each on an intersection of adjacent arcs in the circumferential main groove. Every acute-angle side intersection angle between adjacent arcs at an inflection point is not less than 1 degree and not more than 3 degrees.

This structure ensures a contact area of even a wide tire and achieves uniform contact pressure, which improves tire ice handling performance.

Patent document 1: Japanese Patent Application Laid-open No. 2005-119481

DISCLOSURE OF INVENTION

Problem to be Solved by the Invention

It is an object of the present invention to provide a pneumatic tire with improved ice handling performance.

Means for Solving Problem

To achieve the object mentioned above, according to the present invention, a pneumatic tire includes a carcass layer that extends across a pair of bead cores, a belt layer that is arranged on a circumference of the carcass layer in a tire-radial direction, a belt reinforcing layer that is arranged on outer side of the belt layer in the tire-radial direction, a plurality of circumferential main grooves that extend in a tire circumferential direction, and a plurality of land portions sectioned by the circumferential main grooves. The circumferential main grooves and the land portions are arranged in a tread portion. At least the two circumferential main grooves and at least the three land portions are formed in the tread portion on each side of an equatorial plane. In a cross section in a tire meridian direction of the pneumatic tire, profile lines of the land portions form arcs, an intersection of extension lines of profile lines of adjacent land portions forms an inflection point in an circumferential main groove, and a tensile strength of the belt reinforcing layer in areas of the land portions is larger than a tensile strength of the belt reinforcing layer in an area of the circumferential main groove having the inflection point.

Effect of the Invention

In a pneumatic tire of the present invention, profile lines of land portions are formed in arc, which widens a contact surface shape of the tire, resulting in an increase in contact area of the tire. Extension lines of the profile lines of adjacent land portions intersect while forming an inflection point in a circumferential main groove, and thereby uniform tire contact pressure is achieved. Thus, tire ice handling performance improves, particularly during low-speed traveling. Besides, a tensile strength of a belt reinforcing layer is larger in a land portion area than in a circumferential main groove area having the inflection point. The belt reinforcing layer maintains the profile lines having the inflection point appropriate. Thus, the contact surface shape of the tire is maintained during high-speed traveling (40 [km/h] or more) as well as low-speed traveling. This further improves tire ice handling performance.

EXPLANATIONS OF LETTERS OR NUMERALS

1 Pneumatic tire
2 Bead core
3 Bead filler
4 Carcass layer
5 Belt layer
51 Belt member
6 Tread rubber
61 Circumferential main groove
62 Circumferential main groove
63 Center land portion
64 Second land portion
65 Shoulder land portion
7 Side wall rubber
8 Belt reinforcing layer
81 Belt cover member

BEST MODE(S) FOR CARRYING OUT THE INVENTION

An embodiment of the present invention is explained in detail below with reference to the accompanying drawings. The present invention is not limited to the embodiment described below. It will be apparent to those skilled in the art that many changes and substitutions can be made to the embodiment herein described and that modified examples of the embodiment can be combined in various different ways without departing from the spirit and scope of the present invention.

First Embodiment

Figure 1:
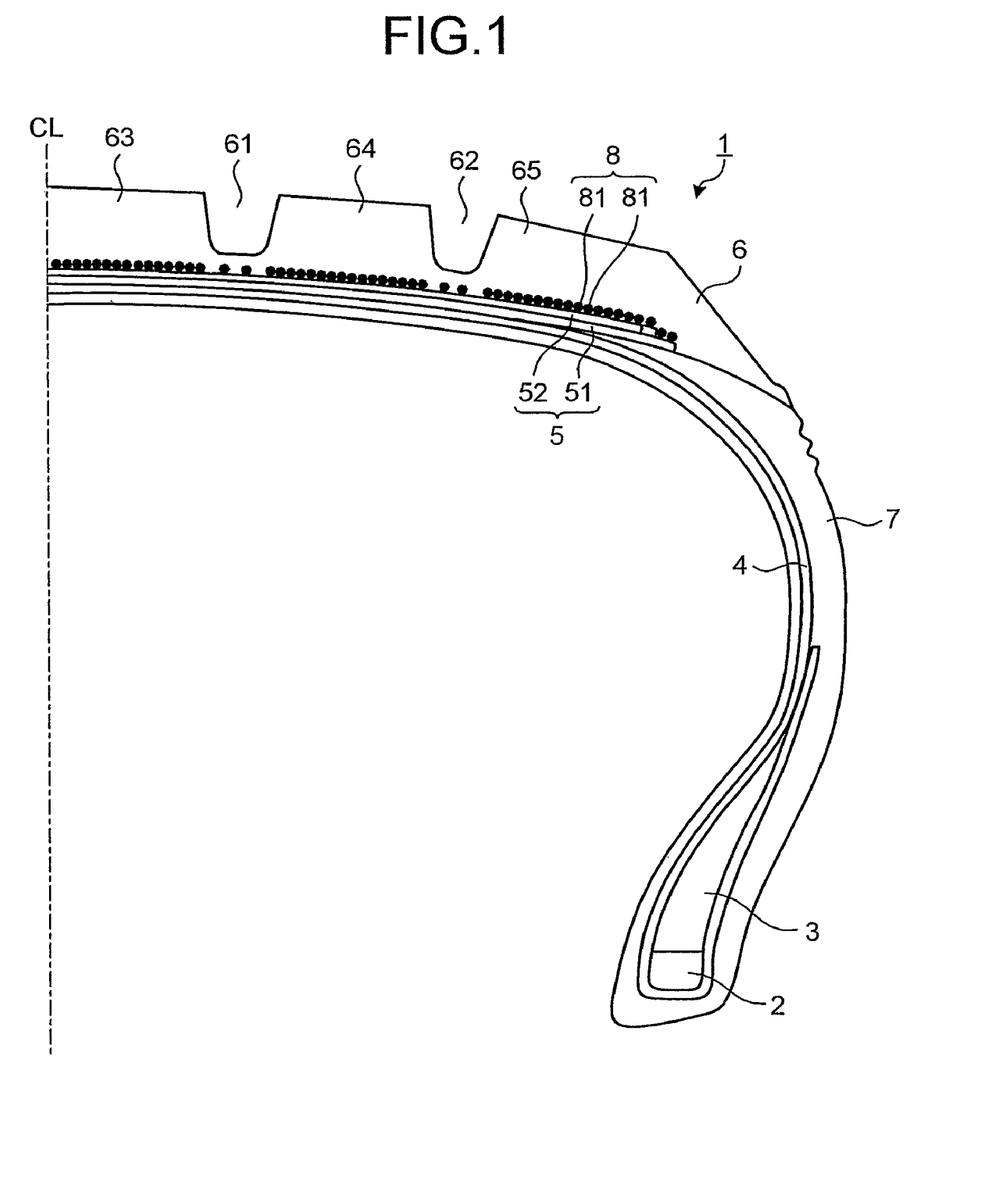
FIG. 1 is a cross section in tire meridian direction of a pneumatic tire according to an embodiment of the present invention.
Figure 2:
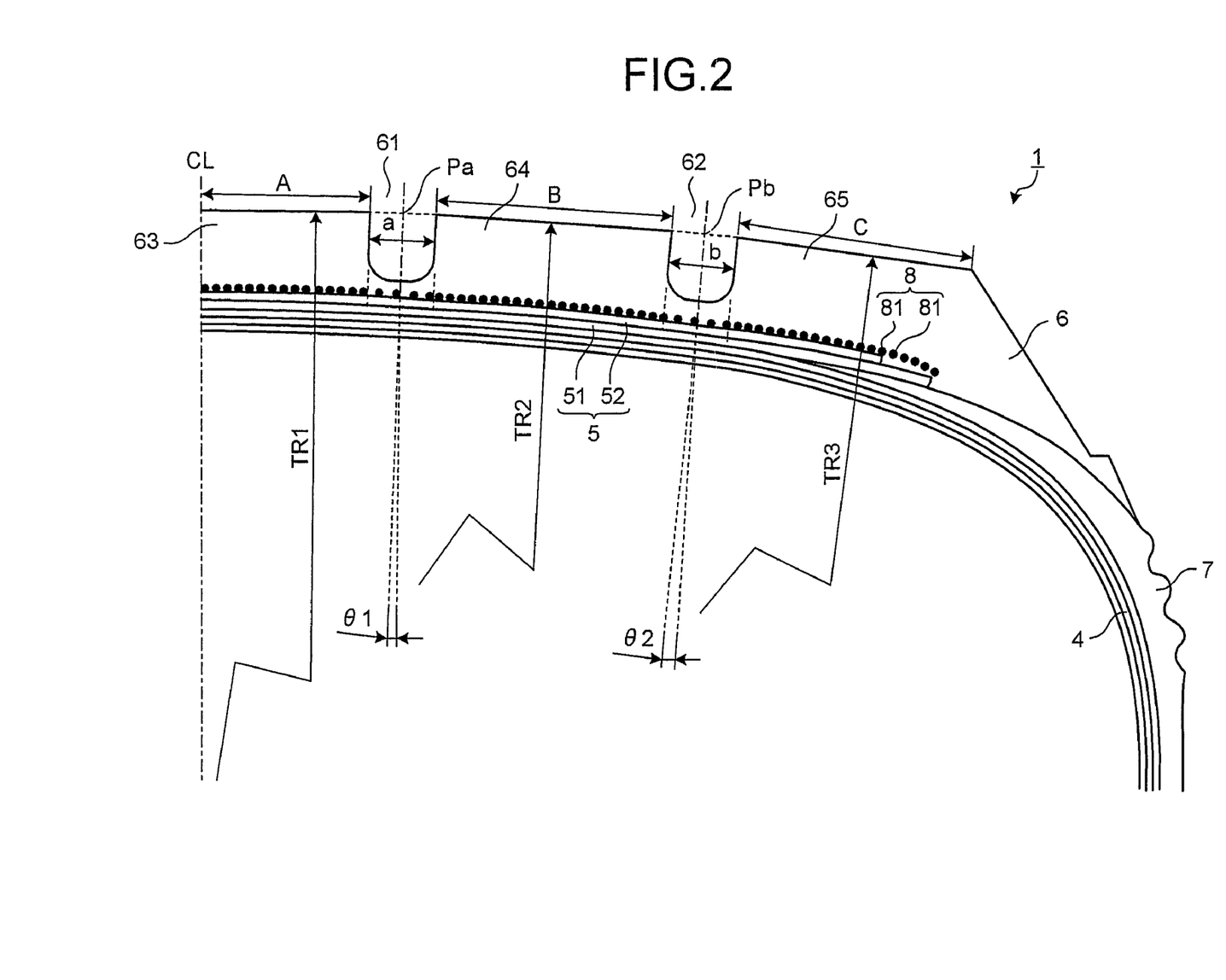
FIG. 2 is an enlarged cross section of a belt reinforcing layer of the pneumatic tire shown in FIG. 1.
Figure 3:
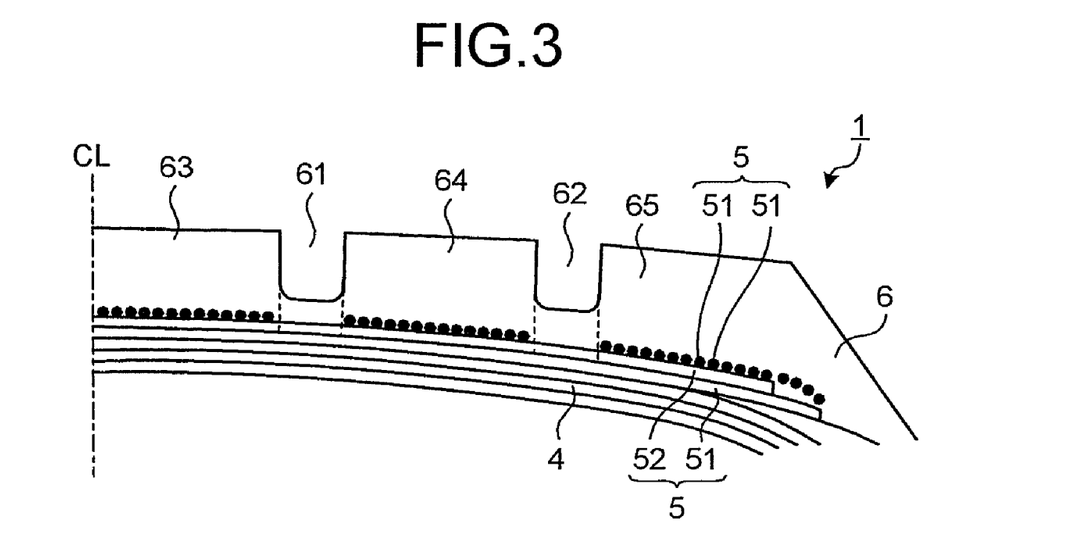
FIG. 3 is an explanatory diagram of a modified example of the pneumatic tire shown in FIG. 1.
Figure 4:
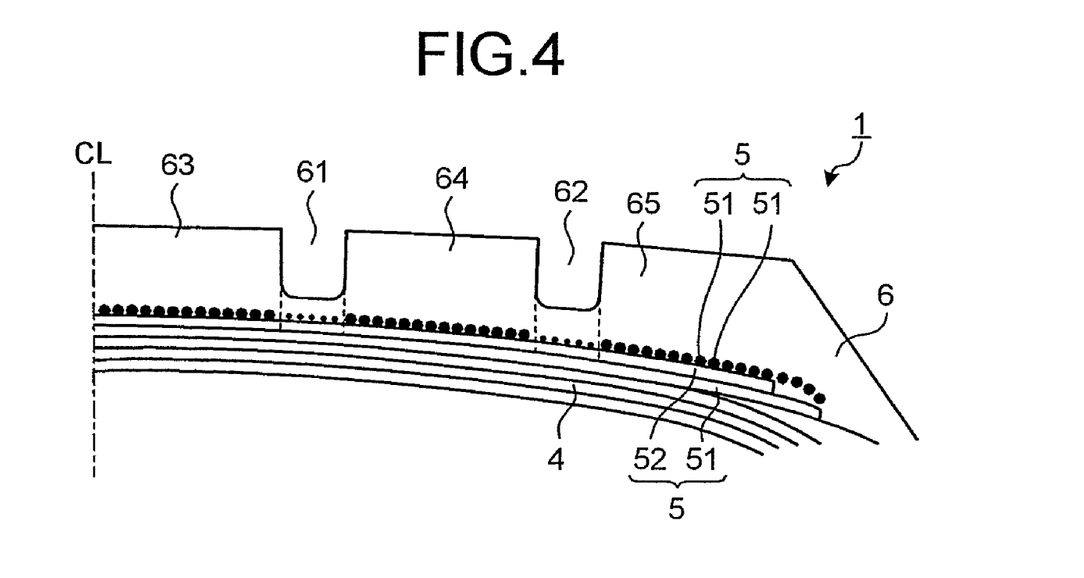
FIG. 4 is an explanatory diagram of another modified example of the pneumatic tire shown in FIG. 1.
Figure 5:
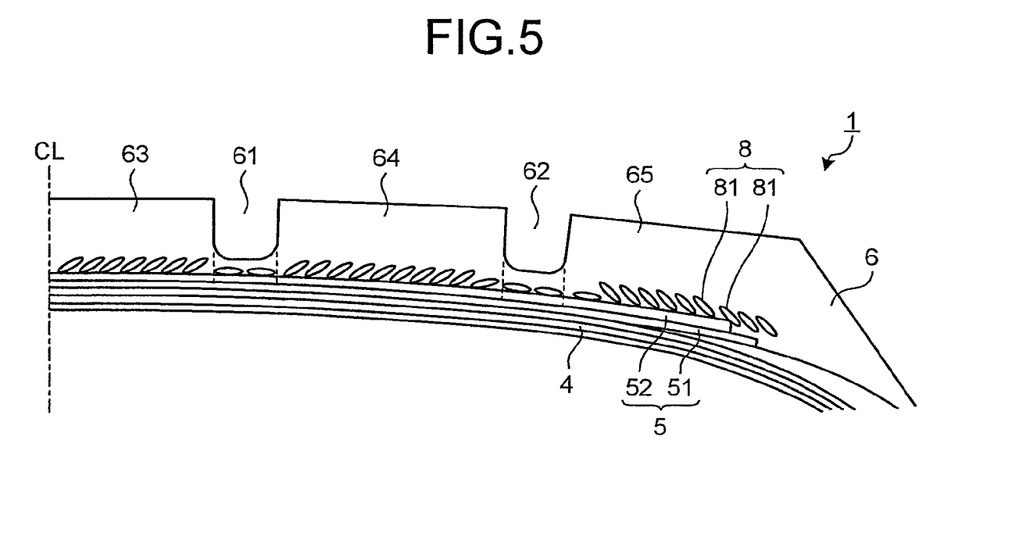
FIG. 5 is an explanatory diagram of still another modified example of the pneumatic tire shown in FIG. 1.
Figure 6:
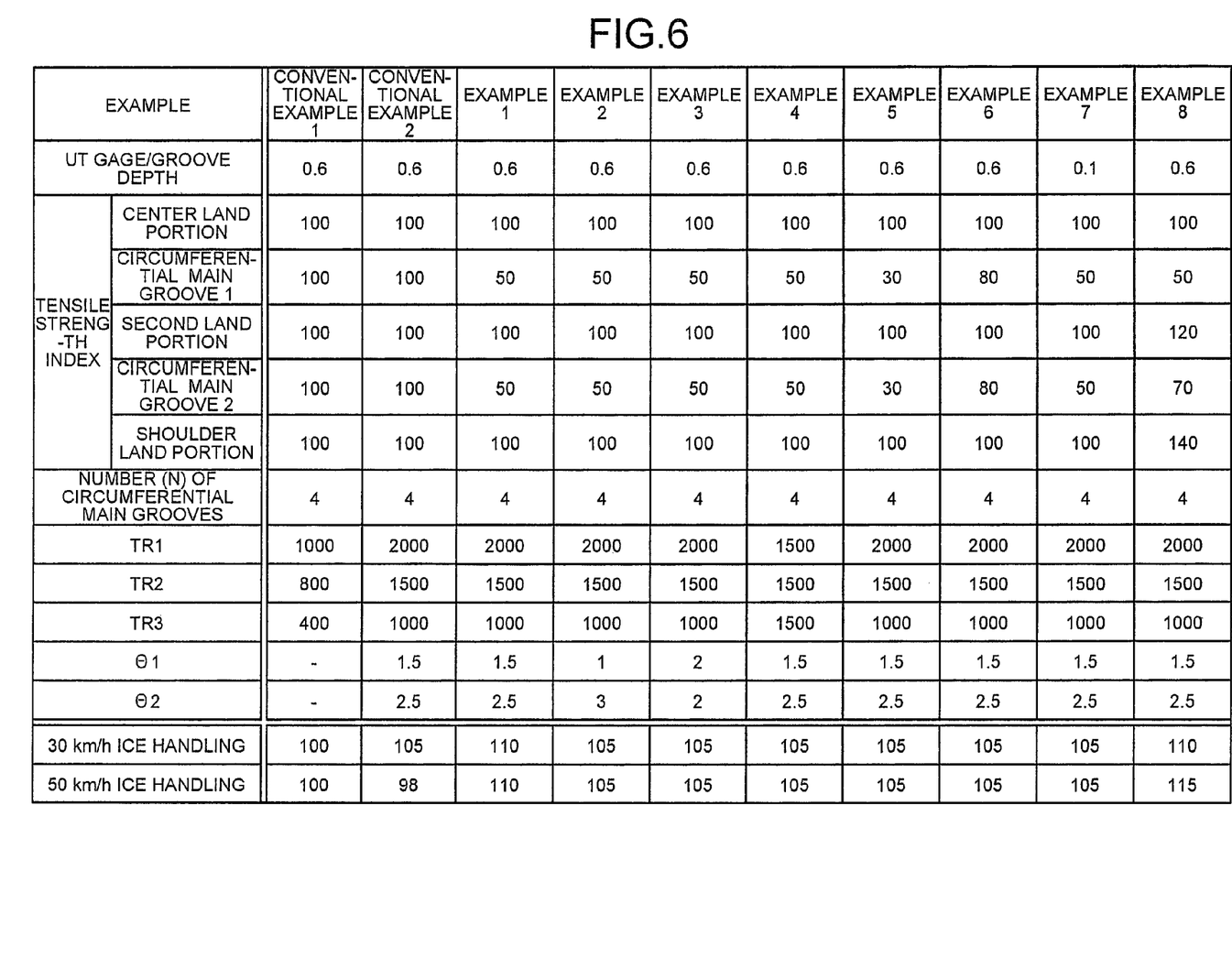
FIG. 6 is a table of results of performance tests of examples of pneumatic tires according to the embodiment of the present invention.

FIG. 1 is a cross section in tire meridian direction of a pneumatic tire according to an embodiment of the present invention. FIG. 2 is an enlarged cross section of a belt reinforcing layer of the pneumatic tire shown in FIG. 1. FIGS. 3 to 5 are explanatory diagrams of modified examples of the pneumatic tire shown in FIG. 1. FIG. 6 is a table of results of performance tests of examples of pneumatic tires according to the embodiment of the present invention.

[Pneumatic Tire]

A pneumatic tire 1 includes a bead core 2, a bead filler 3, a carcass layer 4, a belt layer 5, a tread rubber 6, and a sidewall rubber 7 (see FIG. 1). The bead core 2 includes a pair of left and right bead cores each having a ring-shaped structure. The bead filler 3 is arranged on a tire-radial direction circumference of the bead core 2, and reinforces a bead portion of the pneumatic tire 1. The carcass layer 4 is stretched across the left and right bead cores 2 in a toroidal shape to form a framework of the tire. Both ends of the carcass layer 4 are bent to a tire-width direction outer side such that the carcass layer 4 surrounds the bead filler 3, and are fixed. The belt layer 5 includes a plurality of belt members 51 and 52 in layers and is arranged on a tire-radial direction circumference of the carcass layer 4. The belt layer 5 has a cross-ply structure (in which fiber directions of a layer of the belt members 51 and 52 intersect with each other). The tread rubber 6 is arranged on a tire-radial direction circumference of the carcass layer 4 and the belt layer 5 to form the tread portion of the pneumatic tire 1. The sidewall rubber 7 is arranged on a tire-width direction outer side of the carcass layer 4 to form a side wall portion of the pneumatic tire 1.

The pneumatic tire 1 further includes, on a tread surface, a plurality of circumferential main grooves 61 and 62 and land portions 63 to 65 sectioned by the circumferential main grooves 61 and 62 (see FIG. 1). In the embodiment, at least two circumferential main grooves 61 and 62 are formed on the tread surface on each side of the equatorial plane of the pneumatic tire 1, and three land portions 63 to 65 are sectioned by the circumferential main grooves 61 and 62. The land portions 63 to 65 can be formed of block rows (block pattern) only, ribs (rib pattern) only, or a combination of block rows and ribs (mix pattern). The land portions 63 to 65 include a center land portion (center block or center rib) 63, a second land portion (second block or second rib) 64, and a shoulder land portion (shoulder block or a shoulder rib) 65.

[Inflection Point of Profile Line]

In the cross section in the tire meridian direction of the pneumatic tire 1, profile lines of the land portions 63 to 65 are formed in arc (see FIG. 2). For example, the profile lines of the land portions 63 to 65 form arcs having curvature radii TR1, TR2, and TR3 different from one another. The profile line of the shoulder land portion 65, which is the outermost land portion in a tire-width direction, between the circumferential main groove 62 and a contact edge of the tread portion form an arc having the curvature radius TR3. Compared with a structure in which a land portion has a straight profile line, this structure increases the width of a tire contact surface shape and a contact area. This increases tire grip and tire ice handling performance.

In the pneumatic tire 1, adjacent land portions (the center land portion 63 and the second land portion 64, and the second land portion 64 and the shoulder land portion 65) intersect with inflection points Pa and Pb in (e.g., at the centers of) the circumferential main grooves 61 and 62 (curvature profile). Specifically, a chain of arcs (the profile lines of the land portions and its extension lines) constitute the profile lines of the tread portion, and the inflection points of the profile lines (joining points of arcs) are positioned in the circumferential main grooves. Thus, the inflection points of the profile lines cannot be seen on the land portion 63 to 65, and the contact surfaces of the land portions 63 and 65 have smooth curved lines (arc cross section). Because the contact surfaces of the land portions 63 to 65 are smoothly in contact with the ground during tire rotation, which uniformizes the contact pressure of the tread portion. Thus, the tire grip increases, and thus, the tire ice handling performance increases.

[Belt Reinforcing Layer]

The pneumatic tire 1 includes a belt reinforcing layer 8 (see FIG. 1). The belt reinforcing layer 8 is arranged on a tire-circumferential direction outer side of the belt layer 5, and reinforces the belt layer 5. The belt reinforcing layer 8 is formed by winding a belt cover member 81 made of, for example, steel fibers or organic fibers around the circumference of the belt layer 5. In the embodiment, the belt reinforcing layer 8 covers the belt layer 5 in the tire width direction almost entirely.

The belt reinforcing layer 8 is formed such that a tensile strength of the belt reinforcing layer 8 in areas of the land portions 63 to 65 larger than that in areas of the circumferential main grooves 61 and 62 (low groove area) having the inflection points Pa and Pb (see FIG. 2). In other words, the tensile strength of the belt reinforcing layer 8 in the areas of the circumferential main grooves 61 and 62 having the inflection points Pa and Pb is set lower than that in other areas. Specifically, the end number (winding density, i.e., the number of times of winding) of the belt cover member 81 of the belt reinforcing layer 8 is set small (low) in the areas of the circumferential main grooves 61 and 62 having the inflection points Pa and Pb and set large (high) in the areas of the land portions 63 to 65.

The belt reinforcing layer 8 can be formed of a single type of the belt cover member 81 in any one of a single type and a plurality of types as long as the tensile strength relation is satisfied. The tensile strength of the belt reinforcing layer 8 is defined by a tensile strength per unit width [N/50 mm].

The areas of the circumferential main grooves 61 and 62 of the belt reinforcing layer 8 are portions of the belt reinforcing layer 8 in areas corresponding to maximum widths a and b of the circumferential main grooves 61 and 62 (groove lower portions positioned on a tire-radial direction inner side of the circumferential main grooves 61 and 62). If the circumferential main grooves 61 and 62 have a point height, the areas of the circumferential main grooves 61 and 62 of the belt reinforcing layer 8 are portions of the belt reinforcing layer 8 in an area corresponding to the maximum widths a and b, which include the point height.

In the embodiment, the circumferential main grooves 61 and 62 have the inflection points Pa and Pb, and therefore, the tensile strength of the belt reinforcing layer 8 in each of the areas of the circumferential main grooves 61 and 62 is set lower than other areas. However, setting of the tensile strength is not limited to this. In a structure including a circumferential main groove not having an inflection point (profile lines of a pair of land portions sectioned by a certain circumferential main groove have no inflection point), the tensile strength of the belt reinforcing layer 8 in the area of the circumferential main groove is set to a value equal to the tensile strength of the belt reinforcing layer 8 of the area of an adjacent land portion (not shown).

Because the profile lines of the land portions 63 and 64 of the pneumatic tire 1 are formed in arcs, the width of the tire contact surface shape increases and the contact area increases. Furthermore, because the extension lines of the profile lines of the adjacent land portions 63 and 64, and 64 and 65 intersect with the inflection points Pa and Pb in the circumferential main grooves 61 and 62, the tire contact pressure is uniformized. Thus, the tire ice handling performance improves, particularly during low-speed traveling.

Because the tensile strength of the belt reinforcing layer 8 in the areas of the land portions 63 to 65 is larger than that in the areas of the circumferential main grooves 61 and 62 having the inflection points Pa and Pb, the belt reinforcing layer 8 appropriately maintains the profile lines having the inflection points Pa and Pb. Thus, the tire contact surface shape is maintained during low-speed traveling as well as high-speed traveling (40 [km/h] or more], which further improves the tire ice handling performance. For example, the profile lines are usually defined while importance is attached to the contact surface shape during low-speed traveling. Thus, if the tensile strength of the belt reinforcing layer 8 is uniformly set, the contact pressure fluctuates due to weight difference of the tread portion between the circumferential main grooves and the land portions, which may lower the tire ice handling performance.

[Additional Note 1]

It is preferable in the pneumatic tire 1 that the extension lines of the profile lines of the adjacent land portions 63 and 64, 64 and 65 intersect with intersection angles $\theta 1$ and $\theta 2$ not less than 1 [deg] and not more than 3 [deg] at the inflecting points Pa and Pb (see FIG. 2). In other words, it is preferable that the intersection angles $\theta 1$ and $\theta 2$ on an acute-angle side of the arcs constituting the profile lines of the adjacent land portions 63 and 64, and 64 and 65 at the respective inflection points Pa and Pb are each within a range not less than 1 [deg] and not more than 3 [deg]. The intersection angles $\theta 1$ and $\theta 2$ are also formed if the curvature radii TR1 and TR2, and TR2 and TR3 of the intersecting arcs (profile lines of the land portions 63 and 64, and 64 and 65) are equal.

Because the intersection lines $\theta 1$ and $\theta 2$ of the profile lines are appropriated in this structure, the tire contact pressure is uniformized particularly when the contact surface width of the tread portion is large. This advantageously improves the tire ice handling performance.

[Additional Note 2]

It is preferable in the pneumatic tire 1 that the curvature radius TR2 (TR3) of the profile lines of the land portion 64 (65) positioned on the tire-width direction outer side out of the profile lines of the adjacent land portions 63 and 64 (64 and 65) be not more than the curvature radius TR1 (TR2) of the profile line of the land portion 63 (64) positioned on the tire-width direction inner side, and that the intersection angle $\theta 2$ at the inflection point Pb positioned on the tire-width direction outer side out of the intersection angles $\theta 1$ and $\theta 2$ at the adjacent inflection points Pa and Pb be not less than the intersection angle $\theta 2$ at the inflection point Pb positioned on the tire-width direction inner side (see FIG. 2). In other words, it is preferable that the curvature radii TR1 to TR3 of the profile lines of the land portions 63 to 65 in the example shown in FIG. 2 have a relation of TR1≧TR2≧TR3 and the intersection angles $\theta 1$ and $\theta 2$ thereof have the relations of $\theta 1 \leq \theta 2$.

In this structure, the curvature radii TR1 to TR3 of the profile lines and the intersection angles $\theta 1$ and $\theta 2$ are appropriated. Thus, the tire contact pressure is uniformized particularly in the structure in which the contact surface width of the tread portion is set larger. This advantageously improves the tire ice handling performance.

[Additional Note 3]

It is preferable in the pneumatic tire 1 that the tensile strength of the belt reinforcing layer 8 in the area of the circumferential main groove 61 (62) having the inflection point Pa (Pb) is within a range of 30[%] to 80[%] of the tensile strength of the belt reinforcing layer 8 in the areas of the land portions 63 and 64 (64 and 65) adjacent to the circumferential main groove 61 (62) (see FIG. 2). For example, if the tensile strength of the belt reinforcing layer 8 in the widest one of the land portions 63 and 64 (64 and 65) adjacent to the circumferential main groove 61 (62) on both sides is 100, the tensile strength of the belt reinforcing layer 8 in the area of the circumferential main groove 61 (62) is set to 30 to 80.

In this structure, the ratio between the tensile strength of the belt reinforcing layer 8 in the areas of the circumferential main grooves 61 and 62 and that in the areas of the land portions 63 to 65 are appropriated. Thus, the tire ice handling performance improves, particularly at a traveling speed of 40 [km/h] or more. For example, if the tensile strength of the belt reinforcing layer 8 in the areas of the circumferential main groove 61 (62) is less than 30[%], the curvature profile is accelerated, which often leads to non-uniform tire contact pressure. If the tensile strength of the belt reinforcing layer 8 in the areas of the circumferential main groove 61 (62) is more than 80[%], the difference in rising amount between the circumferential main groove 61 (62) and the land portions 63 and 64 (64 and 65) is large, which reduces effect of the curvature profile.

[Additional Note 4]

It is preferable in the pneumatic tire 1 that at least two block rows of the land portions 63 to 65 be successively arranged in the tire-width direction and the width of the land portions 63 to 65 (in the tire width direction) be uniformized such that the width is within a range of ±10[%] of the average width of the land portions 63 to 65. For example, if two block rows of land portions are successively arranged in the tire width direction and the width of one of the block rows is 100, the width of the other block row is within a range of 90 to 110. If, for example, N circumferential main grooves 61 and 62 are formed in the half-width portion of the tread portion, the interval between centers of the adjacent circumferential main grooves 61 and 62 with respect to the tire contact width is set within a range of ±30[%] with respect to the tire contact width/(N+1).

In this structure, by uniformizing the widths of the successive land portions 63 and 65 in the block rows, the rigidity (block strength) of the land portions 63 to 65 are uniformized. This achieves the tire ice handling performance as well as the snow performance. If the width of a portion of the land portions is relatively too small, the portion does not have enough block strength, which reduces the tire ice handling performance. If the width of a portion of the land portions is relatively too large, it is difficult to ensure snow performance.

In the above structure, any one of a tread pattern (block pattern) including block rows of land portions only and a tread pattern (mix pattern) including block rows and ribs can be adopted.

[Additional Note 5]

It is preferable in the pneumatic tire 1 that the width of the circumferential main grooves 61 and 62 be within a range not less than 3 [mm] and not more than 10 [mm], and the depth of the circumferential main grooves 61 and 62 be within a range not less than 8 [mm] and not more than 16 [mm]. In this structure, because the width and the depth of the circumferential main grooves 61 and 62 are appropriated, the tire snow performance and tire wear resistance are ensured. In a case where the width of the circumferential main grooves is more than 10 [mm] or depth of the circumferential main grooves is more than 16 [mm], the block strength of the land portions in the tire contact surface decreases, which may cause wear in the land portions.

[Additional Note 6]

It is preferable in the pneumatic tire 1 that the tread portion have a multilayer structure including a tread contact surface portion and an under tread portion, that a JIS-A hardness of the under tread portion be within a range not less than 120[%] and not more than 200[%] of the JIS-A rigidity of the tread contact portion, and that the under tread portion have a thickness equal to 40[%] or more of the depth of the circumferential main grooves 61 and 62 (not shown). In other words, it is preferable that a relatively thick under tread portion be employed. It is also preferable that the depth of the circumferential main grooves 61 and 62 be within a range not less than 30[%] and not more than 80[%] of the distance between the belt reinforcing layer 8 and the contact surface of the tread portion.

In a tire employing a thick under tread portion, bending resistance of circumferential main grooves in a tread portion is easily ensured while the tire stops compared with a tire not employing a thick under tread portion. However, importance is attached to tire ice handling performance in such a tire. Thus, a bending angle of a bending portion is set larger to uniformize the tire contact pressure. However, a centrifugal force acting on the tread portion during rotation of the tire deforms the under tread portion particularly in the circumferential main grooves, which leads to non-uniform tire contact pressure.

In this regard, because the above structure employs the under tread portion having a predetermined JIS-A rigidity and a predetermined thickness with respect to the depths of the circumferential main grooves 61 and 62, deformation of the tread portion is suppressed while the tire rotates, which maintains uniformity in the tire contact pressure. Thus, the tire ice handling performance can be maintained.

[Additional Note 7]

It is preferable in the above structure that the tensile strength of the belt reinforcing layer 8 in the areas of the circumferential main grooves 61 and 62 having the inflection points Pa and Pb be within a range not less than 10000 [N/50 mm] and not more than 40000 [N/50 mm], and that the tensile strength of the belt reinforcing layer 8 in the land portions 63 to 65 be within a range not less than 12500 [N/50 mm] and not more than 133333 [N/50 mm]. Because the tensile strength of the belt reinforcing layer 8 is appropriated in this structure, the profile lines of the tire are maintained appropriately. This advantageously improves the tire ice handling performance.

[Additional Note 8]

It is preferable in the pneumatic tire 1 that the tensile strength of the belt reinforcing layer 8 be larger in the area of the circumferential main grooves 61 and 62 having the inflection points Pa and Pb on the tire-width direction outer side, and that the tensile strength of the belt reinforcing layer 8 be larger in the area of the land portions 63 to 65 on the tire-width direction outer side. In the structure shown in FIG. 2, for example, the tensile strength of the belt reinforcing layer 8 in the area of the circumferential main groove 62 on the tire-width direction outer side is set larger than that in the area of the circumferential main groove 61 on the tire-width direction inner side, and the tensile strength of the belt reinforcing layer 8 is set such that the tensile strength in the area of the shoulder land portion 65 is larger than that in the area of the second land portion 64, and the tensile strength in the area of the second land portion 64 is larger than that in the center land portion.

In a structure in which an oblique angle of a belt cord with respect to the tire circumferential direction are different between the belt members 51 and 52 in layers (cross-ply belt layer), generally, a gripping force of a tread portion is small in edge portions of the belt members 51 and 52. On the contrary, the banding force of the tread portion is large in center portions of the belt members 51 and 52. Thus, while the tire is rotating, the deformation amount in the tread portion on the shoulder portion side (shoulder portion side) significantly increases due to centrifugal force. In this structure, because the tensile strength of the belt reinforcing layer 8 is set larger in the tire-width direction outer side (shoulder portion side), deformation of the tread portion is suppressed while the tire rotates. Thus, the profile lines of the tire is maintained particularly at high speed driving (50 [km/h] or more], which maintains the tire ice handling performance.

[Additional Note 9]

It is preferable in the pneumatic tire 1 that the tensile strength of the belt reinforcing layer 8 in each area be adjusted by changing a cord end number (winding density) of the belt cover member 81 (see FIG. 2). For example, the belt cover member 81 is wound in the areas of the circumferential main grooves 61 and 62 in a density lower than that in the land portions 63 to 65. This structure is preferable because the tensile strength of the belt reinforcing layer 8 in each area can be easily adjusted by adjusting the belt cover member 81 in a single type using conventional tire manufacturing equipment.

Alternatively, the tensile strength of the belt reinforcing layer 8 can be adjusted by winding or not winding the belt cover member 81 (see FIG. 3). For example, the belt cover member 81 is not arranged in the areas of the circumferential main grooves 61 and 62 and is wound in the areas of the land portions 63 and 65 only. This structure is preferable because the tensile strength of the belt reinforcing layer 8 can be easily adjusted by adjusting the belt cover member 81 in a single type using conventional tire manufacturing equipment.

Alternatively, the tensile strength of the belt reinforcing layer 8 can be adjusted by changing the diameter of the belt cover member 81 (see FIG. 4). For example, the belt cover member 81 having a small diameter is arranged in the areas of the circumferential main grooves 61 and 62 and the belt cover member 81 having a larger diameter is arranged in the areas of the land portions 63 to 65. This structure is preferable because the reinforcing strength of the belt reinforcing layer 8 in each area can be easily adjusted while the winding density of the belt cover member 81 is maintained approximately uniform using conventional tire manufacturing equipment.

Alternatively, the tensile strength of the belt reinforcing layer 8 can be adjusted by changing positioning of a strip member constituting the belt cover member 81 that is a jointless belt cover member (see FIG. 5). If the belt cover member 81 having a large width is used, for example, the strip member is wound without overlapping in the areas of the circumferential main grooves 61 and 62, and the strip member is wound in an overlapping manner in the areas of the land portions 63 to 65. In this structure, the reinforcing strength of the belt reinforcing layer 8 in each area can be adjusted easily, using conventional tire manufacturing equipment.

[Target Tire]

It is preferable that the pneumatic tire 1 be applied to an RV (recreational vehicle) winter tire or a SUV (sports utility vehicle) winter tire. Such an winter tire often employs profile lines having inflection points Pa and Pb as those explained above to uniformize widening of the contact surface shape and the contact pressure during low-speed traveling. By selecting such winter tires as target tires, tire ice handling performance at a predetermined travel speed range (40 [km/h] or more) can be ensured appropriately.

[Performance Test]

In the embodiment, ice handling performance test was conducted on a plurality of pneumatic tires prepared under different conditions (see FIG. 6). In each performance test, a pneumatic tire in the 255/55R18 size was mounted on an applicable rim defined by JATMA and an internal pressure of 260 [kPa] and a predetermined load were applied to front tires, and an internal pressure of 290 [kPa] and a predetermined load were applied to rear tires. A SUV test vehicle with an engine size of 3500 [cc] mounted with the pneumatic tires was driven on a predetermined icy test course under two conditions of an initial speed of 30 [km/h] and an initial speed of 50 [km/h], and a braking distance when the SUV test vehicle was stopped by an ABS (anti-lock braking system) was measured. The braking distance was measured five times and an average of three values except for the minimum and maximum values was calculated. Index was evaluated based on the average using values of Conventional Example 1 as reference (100). A larger value represents a preferable result.

The tensile strength of belt reinforcing layers of the pneumatic tires of Conventional Examples 1 and 2 were set equal. Curvature radii TR1 to TR3 of profile lines of land portions and intersection angles θ1 and θ2 of profile lines of adjacent land portions of Conventional Example 2 were different from those of Conventional Example 1. In the pneumatic tires 1 of Examples 1 to 8 of the present invention, a tensile force of a belt reinforcing layer in the areas of the circumferential main grooves 61 and 62 was different from that in the areas of the land portions 63 to 65 (see FIG. 2).

As shown in the test results, ice handling performance at an initial speed of 30 [km/h] as well as at an initial speed of 50 [km/h] improves in the pneumatic tires 1 of Examples 1 to 8. In comparison among the pneumatic tires of Examples 1 to 3, it can be understood that the tire ice handling performance improves by appropriating the intersection angles θ1 and θ2 of the profile lines of adjacent land portions. In comparison between Examples 1 and 4, it can be understood that tire ice handling performance improves by appropriating curvature radii TR1 to TR3 of the profile lines of the land portions. In comparison between Examples 5 and 6, it can be understood that tire ice handling performance improves by appropriating the tensile strength of the belt reinforcing layer 8 in the areas of the circumferential main grooves 61 and 62. In comparison between Examples 1 and 7, it can be understood that tire ice handling performance improves by appropriating the relation between an under tread portion and the depth of the circumferential main grooves 61 and 62. In comparison between Examples 1 and 8, it can be understood that tire ice handling performance further improves by appropriating distribution of the tensile strength of the belt reinforcing layer 8 (in the tire width direction).

INDUSTRIAL APPLICABILITY

As explained above, the pneumatic tire of the present invention is effective in improving tire ice handling performance.

The invention claimed is:

1. A pneumatic tire comprising:
a carcass layer that extends across a pair of bead cores;
a belt layer that is arranged on a circumference of the carcass layer in a tire-radial direction;
a single reinforcing layer that covers outer side of the belt layer in the tire-radial direction; and
a tread portion on each side of a tire equatorial plane that includes at least two circumferential main grooves extending in a tire circumferential direction, and at least three land portions sectioned by the circumferential main grooves,
wherein in a cross section in a tire meridian direction, profile lines of the at least three land portions form arcs, an intersection of extension lines of the profile lines of adjacent land portions forms an inflection point in each of the at least two circumferential main grooves between the adjacent land portions, and a first tensile strength of the reinforcing layer in the adjacent land portions is larger than a second tensile strength of the reinforcing layer in the circumferential main groove having the inflection point, and
wherein among the at least two circumferential main grooves having the inflection point, the second tensile strength of the reinforcing layer is larger in the circumferential main groove on an outer side in a tire-width direction than in the circumferential main groove on an inner side in the tire-width direction.

2. The pneumatic tire according to claim 1, wherein the extension lines intersect at an angle of not less than 1 degree and not more than 3 degrees.

3. The pneumatic tire according to claim 1, wherein
among the profile lines of the adjacent land portions, a profile line on the outer side in the tire-width direction has a curvature radius not more than a curvature radius of a profile line on the inner side in the tire-width direction, and
an intersection angle at the inflection point on the outer side in the tire-width direction is not less than an intersection angle at the inflection point on the inner side in the tire-width direction.

4. The pneumatic tire according to claim 1, wherein the second tensile strength is in a range of 30 to 80% of the first tensile strength.

5. The pneumatic tire according to claim 1, wherein
at least two rows of the land portions are arranged in the tire-width direction, and
a width of the land portions is set in a range of ±10% or less of the average width of the land portions.

6. The pneumatic tire according to claim 1, wherein
a width of the circumferential main grooves is in a range of 3 to 10 mm, and
a depth of the circumferential main grooves is in a range of 8 to 16 mm.

7. The pneumatic tire according to claim 1, wherein
the tread portion has a multilayer structure including a tread contact surface and an under tread portion,
a JIS-A hardness of the under tread portion is in a range of 120 to 200% of a JIS-A hardness of the tread contact surface, and
a thickness of the under tread portion is at least 40% of depth of the circumferential main grooves.

8. The pneumatic tire according to claim 1, wherein
the second tensile strength is in a range of 10000 to 40000 N/50 mm, and
the first tensile strength is in a range of 12500 to 133333 N/50 mm.

9. The pneumatic tire according to claim 1, wherein
among the land portions, the first tensile strength of the reinforcing layer is larger in the land portion on the outer side in the tire-width direction than in the land portion on the inner side in the tire-width direction.

10. The pneumatic tire according to claim 1, wherein the first and second tensile strengths of the reinforcing layer in each area is adjusted by adjusting a winding density of a belt cover member constituting the reinforcing layer.

11. The pneumatic tire according to claim 1, wherein the first and second tensile strengths of the reinforcing layer in each area is adjusted by winding or not winding a belt cover member constituting the reinforcing layer.

12. The pneumatic tire according to claim 1, wherein the first and second tensile strengths of the reinforcing layer in each area is adjusted by changing a diameter of a belt cover member constituting the reinforcing layer.

13. The pneumatic tire according to claim 1, wherein the first and second tensile strengths of the reinforcing layer in each area is adjusted by changing a position of a strip member of a jointless belt cover member constituting the reinforcing layer.

14. The pneumatic tire according to claim 1, wherein the pneumatic tire is any one of a winter recreational vehicle tire and a winter sport-utility vehicle tire.

* * * * *